(12) United States Patent
Ehler et al.

(10) Patent No.: US 10,857,874 B2
(45) Date of Patent: Dec. 8, 2020

(54) TANK HAVING A STIFFENING DEVICE

(71) Applicant: TI Automotive Technology Center GmbH, Rastatt (DE)

(72) Inventors: Alex Ehler, Rastatt (DE); Albert J. Boecker, Ettlingen (DE); Patrick Gmünd, Karlsruhe (DE); Peter Grauer, Steinweiler (DE); Gerrit Michaelis, Durmersheim (DE); Matthias B. Olbrich, Rastatt (DE); Ahmad Chehade, Malsch (DE); Moez Haouala, Karlsruhe (DE)

(73) Assignee: TI Automotive Technology Center GmbH, Rastatt (DE)

( * ) Notice: Subject to any disclaimer, the term of this patent is extended or adjusted under 35 U.S.C. 154(b) by 213 days.

(21) Appl. No.: 15/772,721

(22) PCT Filed: Sep. 29, 2016

(86) PCT No.: PCT/EP2016/073203
§ 371 (c)(1),
(2) Date: May 1, 2018

(87) PCT Pub. No.: WO2017/076558
PCT Pub. Date: May 11, 2017

(65) Prior Publication Data
US 2018/0354357 A1 Dec. 13, 2018

(30) Foreign Application Priority Data
Nov. 2, 2015 (DE) .................. 10 2015 221 378

(51) Int. Cl.
*B60K 15/03* (2006.01)
*B60K 6/22* (2007.10)

(52) U.S. Cl.
CPC ........ *B60K 15/03177* (2013.01); *B60K 15/03* (2013.01); *B60K 6/22* (2013.01);
(Continued)

(58) Field of Classification Search
CPC .............. B60K 15/03; B60K 15/03177; B60K 2015/03032; B60K 2015/03493; B60K 6/22; B60Y 2200/92
(Continued)

(56) References Cited

U.S. PATENT DOCUMENTS 6,332,555 B1   12/2001  Stangler
8,910,815 B2 * 12/2014  Mellander .............. B60K 15/03
                                                      220/234
(Continued)

FOREIGN PATENT DOCUMENTS

DE   10 2011 015049 A1   9/2012
DE   10 2013 017000 A1   4/2015
EP        0 816 151 A1   1/1998

OTHER PUBLICATIONS

International Search Report for International Application No. PCT/EP2016/073203 dated Dec. 19, 2016, 2 pgs.
(Continued)

*Primary Examiner* — James N Smalley
*Assistant Examiner* — Madison L Poos
(74) *Attorney, Agent, or Firm* — Dickinson Wright PLLC (57) ABSTRACT

The present disclosure provides a tank, in particular a plastic fuel tank, having a stiffening device, which penetrates the interior of the tank between opposite first and second wall parts of the tank and couples the wall parts to each other, whereby the tank can be subjected to increased interior pressure without damage. According to the present disclosure, the stiffening device comprises a first stiffening element, arranged on the first wall part, and a second stiffening
(Continued)

element, arranged on the second wall part, wherein the first and second stiffening element have interacting coupling parts and wherein the first and second stiffening element can be connected to the first stiffening element with high tensile strength and, in the connected states, seals an opening in the second wall part by means of a flange cover.

20 Claims, 6 Drawing Sheets

(52) U.S. Cl.
CPC ........... *B60K 2015/03032* (2013.01); *B60K 2015/03493* (2013.01); *B60Y 2200/92* (2013.01)

(58) Field of Classification Search
USPC ...................................................... 220/562
See application file for complete search history.

(56) References Cited

U.S. PATENT DOCUMENTS

| | | | |
|---|---|---|---|
| 2009/0206097 A1 | 8/2009 | Klaus et al. | |
| 2011/0140314 A1* | 6/2011 | Grauer | B29C 51/12 |
| | | | 264/516 |
| 2014/0014663 A1 | 1/2014 | Eulitz et al. | |

OTHER PUBLICATIONS

International Preliminary Report on Patentability, International Application No. PCT/EP2016/073203, dated May 3, 2018, 5 pgs.

\* cited by examiner

TANK HAVING A STIFFENING DEVICE

RELATED APPLICATIONS

This application is a 35 U.S.C. § 371 national phase application of International Application No. PCT/EP2016/073203, filed on Sep. 29, 2016, which claims the priority of German Patent Application DE 10 2015 221 378.1, filed Nov. 2, 2015, the contents of which are incorporated herein by reference in their entirety.

FIELD

The present disclosure relates to a tank, in particular a plastic fuel tank, having a stiffening device which penetrates the interior of the tank between opposite first and second wall parts of the tank and couples the wall parts to each other, whereby the tank can be subjected to increased interior pressure without damage, as well as a method for stiffening the tank.

BACKGROUND

The statements in this section merely provide background information related to the present disclosure and may not constitute prior art.

In plastic fuel tanks, increasingly there is the need to be able to use said plastic fuel tanks at greater interior pressure. A reason for this is found in the operation of so-called hybrid vehicles which have both an internal combustion engine and an electric drive, which can also be used at least occasionally on its own. During the operation of the internal combustion engine, fuel vapors produced in the fuel tank are supplied to an active carbon filter and from there every so often to the engine so that no excess pressure is produced in the fuel tank. Since in purely electrical operation this does not take place and the fuel vapors are not allowed to be simply discharged to the environment, a solution to this problem is to contain the fuel vapors in the fuel tank and to permit increased interior pressure therein. To this end, accordingly the fuel tank has to be designed to be pressure-resistant. In order to save weight and material costs, it is desirable to avoid an increase in the wall thickness. A stiffening device acting internally or externally on the tank is, therefore, preferred. A tank of the generic type is known from US 2009/0206097 A1. The stiffening device used there consists of two parts that can be coupled together and each pass through an opening in two opposite wall parts of the tank and seal the openings in the mounted state of the stiffening device. A disadvantage thereof is considered to be the fact that two openings have to be provided in the tank, this doubling the sealing complexity and representing a structural weakening of the tank wall.

SUMMARY

The present disclosure provides a tank having effective and cost-effective stiffening.

Combinations of features which are specified in claims 1 and 14 are proposed. Advantageous embodiments and developments of the invention are disclosed from the dependent claims.

The present disclosure is primarily based on the idea that generally at least one insert is already provided in a fuel tank, in particular a so-called tank module which is approximately pot-shaped and forms a reservoir for fuel and contains a fuel pump. This insert may be used as an element of the stiffening device. According to the invention, the stiffening device comprises a first stiffening element arranged on the first wall part and a second stiffening element arranged on the second wall part, wherein the first and second stiffening elements have interacting coupling parts, wherein the second stiffening element can be connected to the first stiffening element with high tensile strength and, in the connected state, seals an opening in the second wall part by means of a flange cover, and wherein the first stiffening element is fixed via an interposed annular body to an undercut part of the first wall part. The opening in the second wall part is generally already provided as a mounting opening or access opening for the insert.

Since a fluid-tight seal may be achieved only with difficulty by the flange cover alone, the opening in the second wall part is expediently enclosed by an insert ring which is embedded in the wall part, for example a coupling ring according to the standard SAE J2587, and which has a fastening part protruding over the outer face of the wall part. Moreover, a closure ring is provided, said closure ring interacting with the fastening part of the insert ring and encompassing the flange cover of the second stiffening element and pressing against an outer edge of the opening in the second wall part. The closure ring has through-holes which are distributed over its circumference and which receive hook-like projections of the insert ring and which are releasably latched together by rotating the closure ring. Expediently, a sealing body, in particular a sealing ring made of elastomer material, is arranged between the flange cover of the second stiffening element and the second wall part.

The first stiffening element is preferably configured as a pot-shaped insert, in particular as a tank module with a fuel reservoir and a fuel pump arranged therein.

The production of the undercut part in the first wall part may be implemented in a blow mold by sliders which act from outside on the first wall part and which are movably arranged in the blow mold. Alternatively, the undercut part may be produced in the first wall part by a mold part inserted into a blow mold The undercut part is expediently of substantially circular configuration and may consist of at least two, preferably three, separate portions.

In a preferred embodiment of the present disclosure, the annular body comprises outwardly facing retaining ribs on the tank wall side, the free ends thereof being located on a circle before the engagement of the insert in the annular body, the diameter d of said circle being smaller than the diameter D of a circle which defines the free internal diameter of the undercut part. Moreover, the annular body may have a cylindrical wall part with through-holes, latching projections on an outer wall part of the insert being able to be engaged therein.

Expediently, the outer wall part of the insert comprising the latching projections is of substantially cylindrical configuration, with a diameter which at most is the diameter D of the free internal diameter of the undercut part minus the thickness of the wall part of the annular body comprising the through-holes. If the aforementioned dimensions are adapted exactly to one another, a fixing of the insert to the first wall part without clearance is ensured.

The method according to the present disclosure for stiffening a tank, in particular a plastic fuel tank, in order to be able to subject the tank to an increased interior pressure without damage, wherein the tank comprises first and second wall parts opposing one another, is characterized in that a first stiffening element of a stiffening device is fixed via an interposed annular body to an undercut part of the first wall part, a coupling part of a second stiffening element of the stiffening device is brought into engagement through an opening, which is provided in the second wall part and which is aligned with the undercut part of the first wall part, with a complementary coupling part of the first stiffening element, wherein a flange cover of the second stiffening element seals the opening in the second wall part.

In a preferred embodiment of the method, a closure ring is connected to a fastening part of an insert ring, which is embedded in the second wall part and which encloses the opening, whereby the flange cover of the second stiffening element is pressed against the second wall part and seals the opening in a sealed manner together with a sealing body arranged between the second wall part and the flange cover.

Preferably, the first wall part on the tank inner face is provided with an undercut part which may be molded in a blow mold into the first wall part, either by sliders of the blow mold or by a mold part inserted into the blow mold.

Further areas of applicability will become apparent from the description provided herein. It should be understood that the description and specific examples are intended for purposes of illustration only and are not intended to limit the scope of the present disclosure.

DRAWINGS

The present disclosure is described in more detail hereinafter with reference to an exemplary embodiment shown schematically in the drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Variations that do not depart from the substance of the disclosure are intended to be within the scope of the disclosure. Such variations are not to be regarded as a departure from the spirit and scope of the disclosure.

Figure 1A:
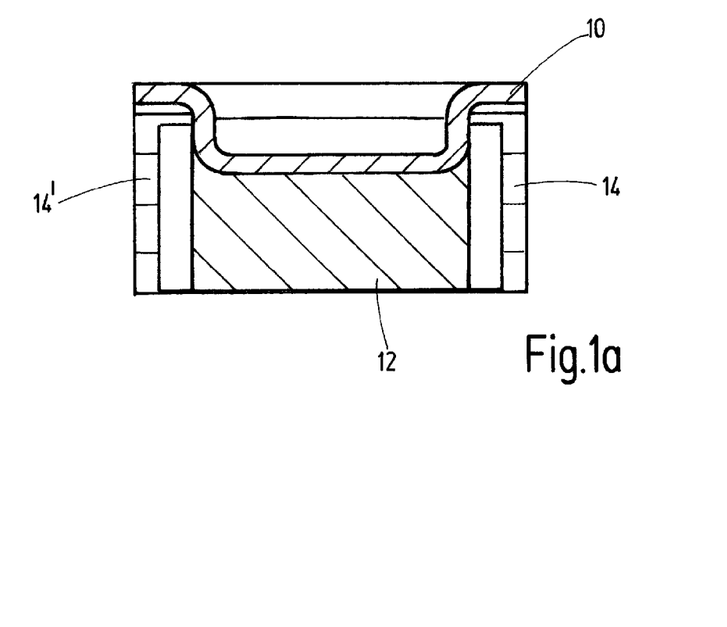
FIGS. 1a and b show a schematic view of the production of an undercut part in a first wall part by means of sliders in a blow mold.
Figure 1B:
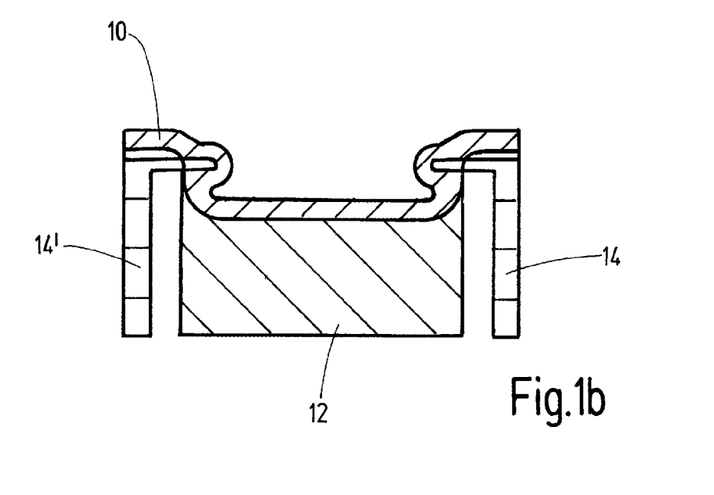

FIG. 1 shows in a simplified manner the production of an undercut part in a first wall part 10 of a plastic tank, which is not shown in more detail, in a blow mold 12. The first wall part 10 is molded in an approximately circular region of the blow mold 12 (FIG. 1a) so that sliders 14, 14' which are arranged at the side may be moved toward one another (FIG. 1b) and at the same time, at a certain distance from the base, the softened heated material of the first wall part 10 may be deformed and thereby form the undercut part. More than two sliders may be used, said sliders being arranged on a circle at equal or unequal circumferential spacings and respectively forming a circular segment-shaped region of the undercut part.

Figure 2:
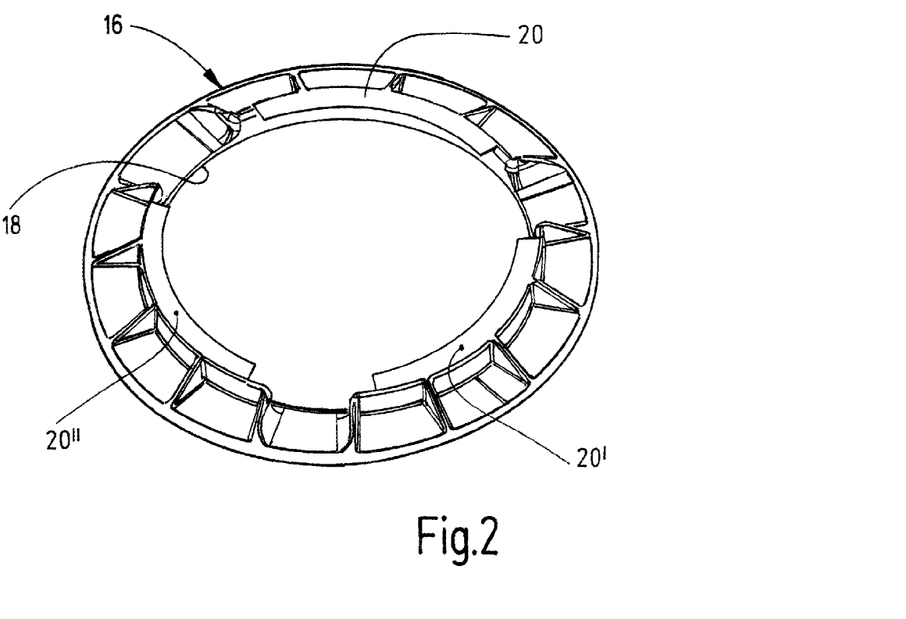
FIG. 2 shows a perspective view of a mold part for producing an undercut part in a blow mold, wherein the mold part is inserted into the blow mold and acts from outside on the first wall part.

Alternatively, the mold part 16 shown in FIG. 2 may be used for producing the undercut part. The mold part is annular with a central through-hole 18 which defines the diameter of the undercut part. The mold part 16 is inserted into the blow mold before the start of the blow-molding process, at the location at which the undercut part is intended to be produced. When molding the first wall part, the mold part 16 is located between the blow mold and the outer face of the first wall part. The mold part 16 has, at a distance from an imaginary base plane, three inwardly facing part-circular-shaped ribs 20, 20', 20", the material of the first wall part flowing around said ribs and said ribs forming on the inner face of the first wall part three corresponding undercut portions (see FIG. 3). After the blow molding, the mold part is substantially molded into the first wall part and thus remains on the tank; thus it is a non-reusable sacrificial part.

Figure 3:
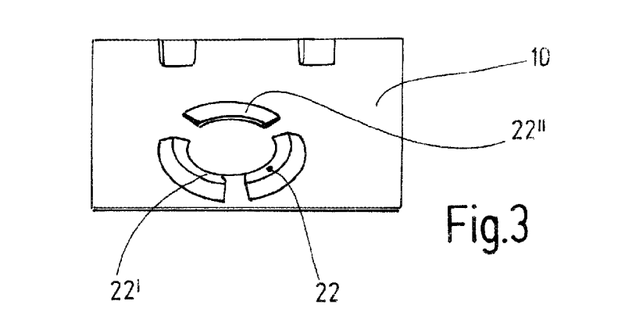
FIG. 3 shows a schematic view of an undercut part on the inner face of a first wall part.

FIG. 3 shows a view of the inner face of the first wall part of the tank with an undercut part which is formed by three undercut portions 22, 22', 22" and which may be formed by one of the two methods described above.

Figure 4:
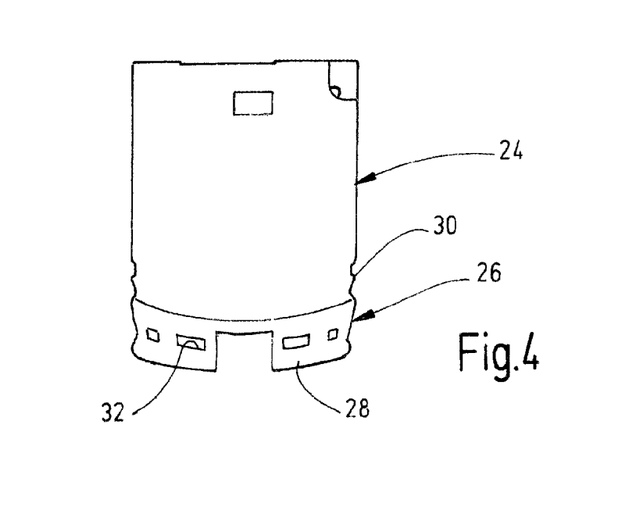
FIG. 4 shows a schematic view of an insert and an annular body in a premounted state.
Figure 5:
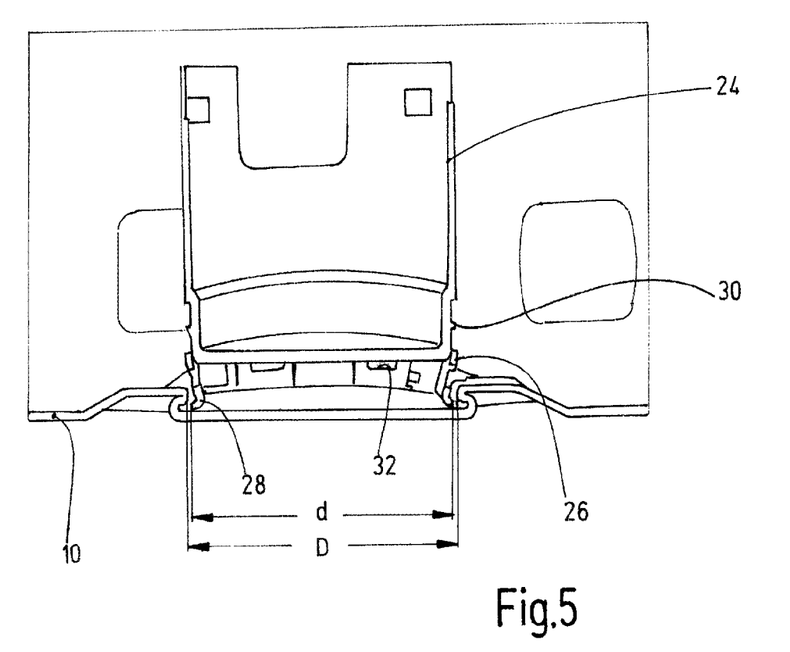
FIG. 5 shows the positioning of the insert and the annular body according to FIG. 4 in the undercut part before the final mounting.

FIG. 4 shows an insert 24 configured as a tank module and an annular body 26. The insert 24 and the annular body 26 are located in a premounted or partially mounted state in which a part of the insert 24 on the floor side is inserted partially into a space formed in the ring interior and the two parts are held together. In the region of its free end or the end on the floor side, the annular body 26 has a plurality of outwardly facing, segmented retaining ribs 28, the circumference thereof, as may be seen, having a diameter d which is smaller than the diameter D of an inscribed circle of the undercut portions 22, 22', 22", i.e. the region of the annular body 26 with the retaining ribs 28 may be inserted into the undercut part, as far as the first wall part, past the undercut portions 22, 22', 22", as shown in FIG. 5. Naturally, the annular body 26 and the insert 24 may also be mounted separately and in this sequence one after the other into the undercut part.

Figure 6:
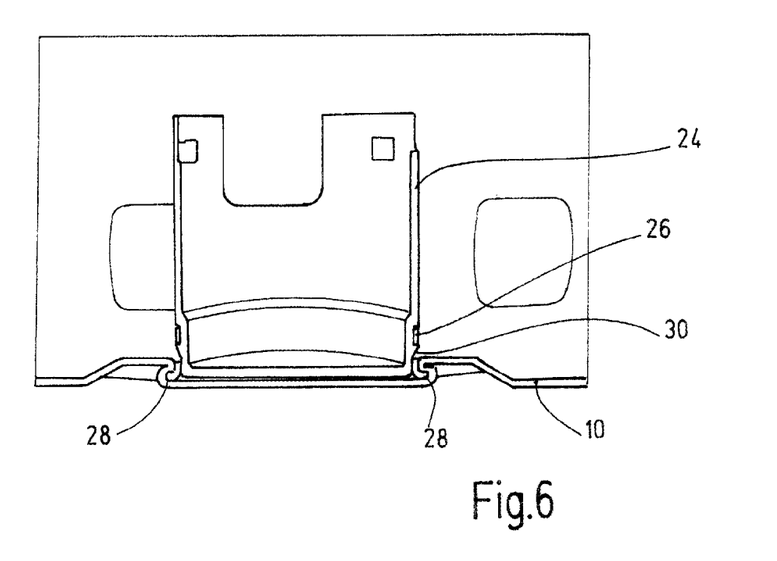
FIG. 6 shows the end position of the insert and the annular body according to FIG. 4 after mounting in the undercut part.

FIG. 5 shows the combination of the insert 26 and the annular body 26 inserted into the undercut part. The insert is pushed from this intermediate position in the direction of the first wall part 10. In doing so, the region of the retaining ribs 28 of the annular body 26 is spread apart and the retaining ribs 28 are introduced into the undercuts. At the same time, the latching projections 30 engage on the outer face of the part of the insert 24 on the floor side in complementary through-holes 32 in the cylindrical wall of the annular body 26, so that the annular body 26 is fixed in the undercut part and the insert 24 is fixed in the annular body, as FIG. 6 shows. The respective dimensions of the undercut part, the annular body 26 and the insert 24 are selected such that the insert is mounted substantially without clearance on the first wall part 10.

Figure 7:
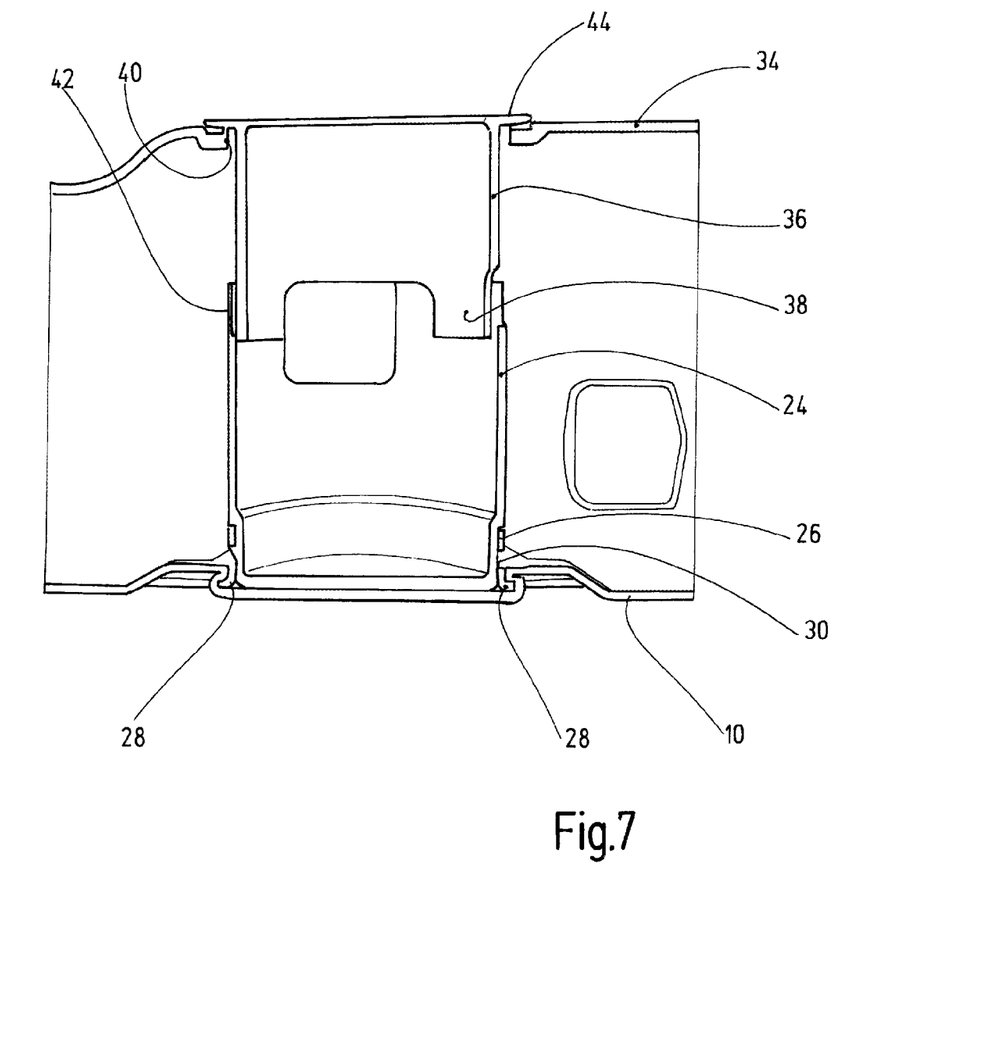
FIG. 7 shows a stiffening device shown in a simplified manner in the cover region, arranged between the first and a second wall part of the tank, and comprising first and second stiffening elements, wherein the first stiffening element is formed by the insert.
Figure 8:
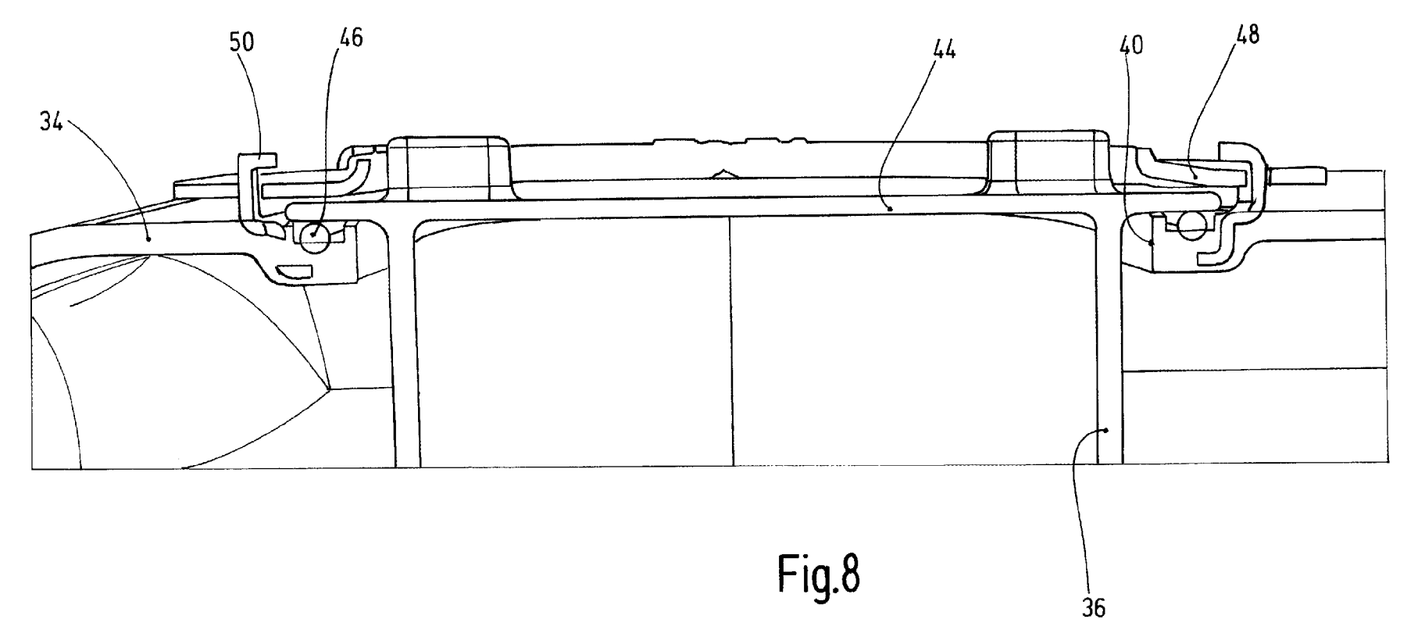
FIG. 8 shows the cover region of the stiffening device in cross section.
Figure 9:
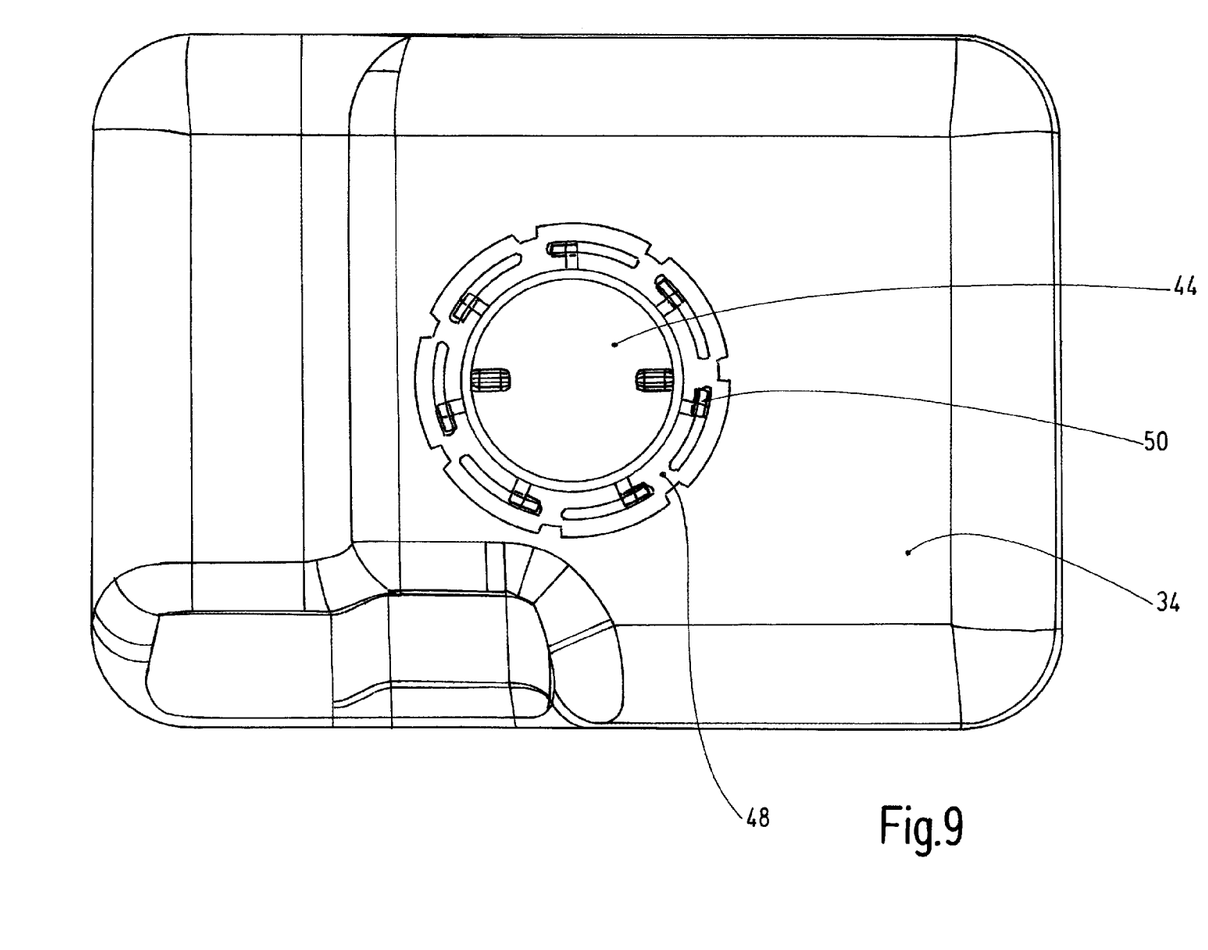
FIG. 9 shows a plan view of the cover region.

FIG. 7 shows a stiffening device which is arranged between the first wall part 10 and an opposing second wall part 34, and which is substantially formed by the above-described insert 24 as a first stiffening element and a second stiffening element 36. The second stiffening element 36 is inserted with a tubular coupling part 38 through an opening 40 in the second wall part 34 opposing the undercut part of the first wall part 10 into the tank interior and into a complementary coupling part 42 of the insert 24. If the second stiffening element 36 is positioned in such a manner, at the same time a flange cover 44 of the second stiffening element 36 bears against a sealing ring 46 enclosing the opening 40 and shown in more detail in FIG. 8. The flange cover 44 is pressed against the sealing ring 46 by a closure ring 48, wherein the closure ring 48 interacts with a bayonet ring 50 molded into the second wall part 34, for example a conventional closure ring according to the standard SAE J2587. The bayonet ring 50 has closure parts which protrude over the second wall part 34 and which engage in openings provided therefor in the closure ring 48 and which by rotating the closure ring 48 ensure the locking thereof, wherein at the same time the contact pressure required for a fluid-tight closure of the opening 40 is applied to the flange cover 44. FIG. 8 shows a section through the tank in the region of the flange cover 44 and FIG. 9 shows a plan view of the closure mechanism formed by the flange cover 44, the closure ring 48 and the bayonet ring 50.

The second stiffening element 36 may be rotated about a longitudinal central axis which is common with the insert 24. As a result, coupling members provided on the coupling parts 38, 42 are brought into locking engagement with one another so that the two stiffening elements 24, 36 are connected together with high tensile strength. Both the connection of the coupling parts 38, 42 and the locking of the closure ring 48 are designed to be releasable so that the second stiffening element may be removed at any time in order to gain access to the tank interior, for example to replace a defective fuel pump.

In summary, the following is to be noted: the present disclosure relates to a tank, in particular a plastic fuel tank, having a stiffening device which penetrates the interior of the tank between opposite first and second wall parts 10, 34 of the tank and couples the wall parts 10, 34 to each other, whereby the tank may be subjected to increased interior pressure without damage. According to the present disclosure, the stiffening device has a first stiffening element 24 arranged on the first wall part 10 and a second stiffening element 36 arranged on the second wall part 34, wherein the first and second stiffening elements 24, 36 have interacting coupling parts 38, 42 and wherein the second stiffening element 36 can be connected to the first stiffening element 24 with high tensile strength and, in the connected state, seals an opening 40 in the second wall part 34 by means of a flange cover 44.

The invention claimed is:

1. A plastic fuel tank having a stiffening device which penetrates an interior of the tank between opposite first and second wall parts of the tank and couples the wall parts to each other, whereby the tank can be subjected to increased interior pressure without damage, wherein the stiffening device comprises a first stiffening element arranged on the first wall part and a second stiffening element arranged on the second wall part, wherein the first and second stiffening elements have interacting coupling parts and wherein the second stiffening element can be connected to the first stiffening element to transfer tensile forces from the increased interior pressure and, in the connected state, seals an opening in the second wall part by means of a flange cover, wherein the first stiffening element is fixed via an interposed annular body to an undercut part of the first wall part.

2. The tank as claimed in claim 1, wherein the flange cover of the second stiffening element is arranged on the tank outer face.

3. The tank as claimed in claim 1, wherein the opening in the second wall part is enclosed by an insert ring which is embedded in the wall part and which has a fastening part protruding on the outside over the wall part.

4. The tank as claimed in claim 3, wherein a closure ring is provided, said closure ring interacting with the fastening part of the insert ring and encompassing the flange cover of the second stiffening element, and pressing against an outer edge of the opening in the second wall part.

5. The tank as claimed in claim 4, wherein a sealing body is arranged between the flange cover of the second stiffening element and the outer edge of the opening in the second wall part.

6. The tank as claimed in claim 1, wherein the first stiffening element is configured as a pot-shaped insert to serve as a tank module with a fuel reservoir and a fuel pump arranged therein.

7. The tank as claimed in claim 1, wherein the undercut part is produced in the first wall part in a blow mold by sliders which act from outside on the first wall part and which are movably arranged in the blow mold.

8. The tank as claimed in claim 1, wherein the undercut part is produced in the first wall part by a mold part inserted into a blow mold.

9. The tank as claimed in claim 1, wherein the undercut part is of substantially circular configuration.

10. The tank as claimed in claim 1, wherein the undercut part consists of at least two, preferably three, separate portions.

11. The tank as claimed in claim 1, wherein the annular body comprises outwardly facing retaining ribs on the tank wall side, the free ends thereof being located on a circle before the engagement of the insert in the annular body, the diameter d of said circle being smaller than the diameter D of a circle which defines the free internal diameter of the undercut part.

12. The tank as claimed in claim 1, wherein the annular body has a cylindrical wall part with through-holes, latching projections on an outer wall part of the insert being able to be engaged therein.

13. The tank as claimed in claim 12, wherein the outer wall part of the insert comprising the latching projections is of substantially cylindrical configuration with a diameter which at most is the diameter D of the free internal diameter of the undercut part minus the thickness of the wall part of the annular body comprising the through-holes.

14. A method for stiffening a plastic fuel tank, in order to be able to subject the tank to an increased internal pressure without damage, wherein the tank comprises first and second wall parts opposing one another, comprising the steps of, fixing a first stiffening element of a stiffening device to an undercut part of the first wall part via an interposed annular body, bringing into engagement a coupling part of a second stiffening element of the stiffening device with a complementary coupling part of the first stiffening element through an opening that is provided in the second wall part and which is aligned with the undercut part of the first wall part, wherein a flange cover of the second stiffening element seals the opening in the second wall part.

15. The method as claimed in claim 14, wherein a closure ring is connected to a fastening part of an insert ring, which is embedded in the second wall part and which encloses the opening, whereby the flange cover of the second stiffening element is pressed against the second wall part and seals the opening in a sealed manner together with a sealing body arranged between the second wall part and the flange cover.

16. The method as claimed in claim 14, wherein the first wall part on the tank inner face is provided with an undercut part.

17. The method as claimed in claim 16, wherein the undercut part is molded in a blow mold into the first wall part by sliders of the blow mold or by a mold part inserted into the blow mold.

18. The tank as claimed in claim 5, wherein the sealing body is a sealing ring made of elastomer material.

19. The tank as claimed in claim 1, wherein the interposed annular body is separately formed from the first stiffening element.

20. The method as claimed in claim 14, wherein the interposed annular body is separately formed from the first stiffening element.

* * * * *